US012571638B2

(12) United States Patent
Nagata et al.

(10) Patent No.: US 12,571,638 B2
(45) Date of Patent: Mar. 10, 2026

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Yu Nagata, Chofu (JP); Toshihiro Nakamura, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 17/731,489

(22) Filed: Apr. 28, 2022

(65) Prior Publication Data

US 2023/0011007 A1 Jan. 12, 2023

(30) Foreign Application Priority Data

Jul. 8, 2021 (JP) .................................. 2021-113630

(51) Int. Cl.
*G01C 21/34* (2006.01)
*G06Q 10/047* (2023.01)
*G06Q 10/0631* (2023.01)
*G06Q 50/40* (2024.01)

(52) U.S. Cl.
CPC ....... *G01C 21/3469* (2013.01); *G06Q 10/047* (2013.01); *G06Q 10/06315* (2013.01); *G06Q 50/40* (2024.01)

(58) Field of Classification Search
CPC ............. G01C 21/3469; G06Q 10/047; G06Q 10/06315; G06Q 50/40; G06Q 10/08743; G06Q 30/0207; G06Q 30/0211; Y02T 10/62; G08G 1/202; G08G 1/20
See application file for complete search history.

(56) References Cited

U.S. PATENT DOCUMENTS

| | | | | |
|---|---|---|---|---|
| 9,182,764 B1 * | 11/2015 | Kolhouse | ............... | G01C 21/34 |
| 9,671,241 B2 * | 6/2017 | Tang | .................. | G01C 21/3469 |
| 9,792,575 B2 * | 10/2017 | Khasis | ............... | G01C 21/3415 |
| 9,922,469 B1 * | 3/2018 | Ashton | ............... | G06Q 10/047 |
| 11,551,315 B2 * | 1/2023 | Sung | .................... | G06Q 30/018 |
| 11,609,571 B2 * | 3/2023 | McKenzie | ......... | G01C 21/3469 |

(Continued)

FOREIGN PATENT DOCUMENTS

| | | | | |
|---|---|---|---|---|
| CA | 3132053 A1 * | 9/2020 | ......... | G01C 21/3469 |
| CN | 110785631 A | 2/2020 | | |

(Continued)

OTHER PUBLICATIONS

JP 2019144948 A machine translation (Year: 2019).*

(Continued)

*Primary Examiner* — Fadey S. Jabr
*Assistant Examiner* — Mark Robert Heim
(74) *Attorney, Agent, or Firm* — Sughrue Mion, PLLC

(57) ABSTRACT

When a control unit assigns, to each of multiple routes, any of multiple vehicles that is able to travel with a drive source of at least one of an electric motor and an internal combustion engine, categories of the vehicles being different from each other, the control unit determines, based on a cost or an environmental load when the vehicle is caused to travel on the routes with the electric motor and a cost or an environmental load when the vehicle is caused to travel on the routes with the internal combustion engine, combinations of the vehicles and the routes.

19 Claims, 10 Drawing Sheets

(56) References Cited

U.S. PATENT DOCUMENTS

| | | | | |
|---|---|---|---|---|
| 11,655,642 | B2 * | 5/2023 | Bertram | E04G 21/0463 |
| | | | | 701/50 |
| 11,774,255 | B2 * | 10/2023 | Oliver Gomila | G06Q 30/018 |
| | | | | 705/317 |
| 11,959,758 | B2 * | 4/2024 | Diamond | G01C 21/3691 |
| 11,976,927 | B2 * | 5/2024 | Bruns | G01C 21/3415 |
| 2004/0093264 | A1 * | 5/2004 | Shimizu | G07C 5/008 |
| | | | | 705/13 |
| 2008/0015975 | A1 * | 1/2008 | Ivchenko | G06Q 50/26 |
| | | | | 123/3 |
| 2008/0154671 | A1 * | 6/2008 | Delk | G01N 33/0075 |
| 2009/0144149 | A1 * | 6/2009 | Sakakibara | G07F 17/0014 |
| | | | | 705/14.62 |
| 2009/0164114 | A1 * | 6/2009 | Morikawa | G01C 21/3492 |
| | | | | 701/532 |
| 2009/0210295 | A1 * | 8/2009 | Edholm | G06Q 10/06393 |
| | | | | 705/1.1 |
| 2010/0145569 | A1 * | 6/2010 | Bourque | G01C 21/3469 |
| | | | | 701/31.4 |
| 2010/0332132 | A1 * | 12/2010 | Okude | G08G 1/096816 |
| | | | | 701/414 |
| 2011/0022527 | A1 * | 1/2011 | Onishi | G06Q 30/06 |
| | | | | 705/317 |
| 2011/0029170 | A1 * | 2/2011 | Hyde | B60W 30/182 |
| | | | | 701/1 |
| 2011/0077805 | A1 * | 3/2011 | Hyde | G06Q 10/08 |
| | | | | 701/1 |
| 2011/0099100 | A1 * | 4/2011 | Onishi | G06Q 10/04 |
| | | | | 705/37 |
| 2011/0137768 | A1 * | 6/2011 | Onishi | G06Q 50/14 |
| | | | | 705/30 |
| 2011/0145438 | A1 * | 6/2011 | Sakamoto | G06Q 10/04 |
| | | | | 709/238 |
| 2011/0270486 | A1 * | 11/2011 | Stevens | G07C 5/008 |
| | | | | 701/31.4 |
| 2012/0022904 | A1 * | 1/2012 | Mason | G06Q 10/06311 |
| | | | | 705/333 |
| 2012/0226624 | A1 * | 9/2012 | Song | G06Q 10/083 |
| | | | | 705/338 |
| 2012/0290506 | A1 * | 11/2012 | Muramatsu | G01C 21/3679 |
| | | | | 701/400 |
| 2013/0006530 | A1 * | 1/2013 | Nishiuma | G01C 21/3469 |
| | | | | 701/533 |
| 2013/0096815 | A1 * | 4/2013 | Mason | G08G 1/20 |
| | | | | 701/400 |
| 2013/0144811 | A1 * | 6/2013 | Padmalayam Narayana Kurup | G06Q 50/40 |
| | | | | 705/413 |
| 2013/0218427 | A1 * | 8/2013 | Mukhopadhyay | G06F 17/00 |
| | | | | 701/99 |
| 2013/0297199 | A1 * | 11/2013 | Kapp | B61L 15/0058 |
| | | | | 701/411 |
| 2014/0039988 | A1 * | 2/2014 | Londergan | G06Q 30/0207 |
| | | | | 705/14.1 |
| 2014/0136025 | A1 * | 5/2014 | Cooper | B61L 27/12 |
| | | | | 701/2 |
| 2015/0248639 | A1 * | 9/2015 | Maney | G06Q 10/08345 |
| | | | | 705/335 |

| | | | | |
|---|---|---|---|---|
| 2016/0076899 | A1 * | 3/2016 | Macneille | G08G 1/09685 |
| | | | | 701/428 |
| 2016/0247109 | A1 * | 8/2016 | Scicluna | G06Q 50/40 |
| 2016/0334233 | A1 * | 11/2016 | Baverstock | G01C 21/3453 |
| 2016/0364679 | A1 * | 12/2016 | Cao | G06Q 10/083 |
| 2017/0069041 | A1 * | 3/2017 | Akiba | G08G 7/00 |
| 2017/0088000 | A1 * | 3/2017 | Payne | B60L 53/64 |
| 2017/0154301 | A1 * | 6/2017 | Stevenson | G07F 13/025 |
| 2017/0199045 | A1 * | 7/2017 | George | G01C 21/3469 |
| 2019/0107407 | A1 * | 4/2019 | Bucsan | G01C 21/3461 |
| 2019/0120640 | A1 * | 4/2019 | Ho | G01C 21/3453 |
| 2019/0228375 | A1 * | 7/2019 | Laury | G05D 1/0088 |
| 2019/0285425 | A1 * | 9/2019 | Ludwick | G06Q 10/0631 |
| 2020/0049523 | A1 | 2/2020 | Kato et al. | |
| 2020/0175432 | A1 * | 6/2020 | Iwasaki | G06Q 10/047 |
| 2020/0262424 | A1 * | 8/2020 | Kong | G05D 1/0212 |
| 2020/0284600 | A1 * | 9/2020 | Oliver Gomila | G06Q 30/018 |
| 2021/0012230 | A1 * | 1/2021 | Hayes | G05D 1/0088 |
| 2021/0055120 | A1 * | 2/2021 | Roth | G06Q 10/08355 |
| 2021/0080955 | A1 * | 3/2021 | Wilkinson | B60W 60/0011 |
| 2021/0241626 | A1 * | 8/2021 | Nishimura | B60L 58/13 |
| 2021/0285787 | A1 * | 9/2021 | Alekseenko | G01C 21/3682 |
| 2021/0291687 | A1 * | 9/2021 | Ferguson | G05D 1/0291 |
| 2022/0156693 | A1 * | 5/2022 | Singh | G06Q 30/0205 |
| 2022/0164722 | A1 * | 5/2022 | Sadeghianpourhamami | G06Q 10/047 |
| 2022/0252415 | A1 * | 8/2022 | Meroux | G08G 1/20 |
| 2023/0022823 | A1 * | 1/2023 | Hirano | G08G 1/096816 |
| 2023/0023960 | A1 * | 1/2023 | Nagata | G06Q 30/0283 |
| 2023/0044784 | A1 * | 2/2023 | Hauser | G06Q 50/06 |
| 2023/0044920 | A1 * | 2/2023 | Watanabe | B60W 60/0015 |
| 2023/0059112 | A1 * | 2/2023 | Ito | G01C 21/3469 |
| 2023/0138671 | A1 * | 5/2023 | Ashby | B60W 10/06 |
| | | | | 701/23 |
| 2023/0417564 | A1 * | 12/2023 | Salter | G06Q 30/0278 |

FOREIGN PATENT DOCUMENTS

| | | | | |
|---|---|---|---|---|
| DE | 102017203015 A1 * | 8/2018 | | G07C 5/008 |
| JP | 2001078304 A * | 3/2001 | | |
| JP | 2009134450 A * | 6/2009 | | B60L 11/14 |
| JP | 2010188808 A * | 9/2010 | | |
| JP | 2010266204 A * | 11/2010 | | |
| JP | 2011000915 A * | 1/2011 | | |
| JP | 2011003002 A * | 1/2011 | | |
| JP | 2015011576 A * | 1/2015 | | G01C 21/3469 |
| JP | 2019144948 A * | 8/2019 | | |
| WO | WO-2014127849 A1 * | 8/2014 | | G01C 21/343 |
| WO | 2018/230646 A1 | 12/2018 | | |

OTHER PUBLICATIONS

JP 2011003002 A machine translation (Year: 2011).*
JP 2001078304 A machine translation (Year: 2001).*
JP-2009134450-A machine translation (Year: 2009).*
JP2010266204A machine translation (Year: 2010).*
JP2011000915A machine translation (Year: 2011).*
JP2015011576A machine translation (Year: 2015).*
WO2014127849A1 machine translation (Year: 2014).*
JP 201018880 A machine translation (Year: 2010).*
JP 2010188808 A machine translation (Year: 2010).*
DE-102017203015-A1 machine translation (Year: 2018).*

* cited by examiner

BOARDING REQUEST ACQUISITION UNIT ~ 301

VEHICLE INFORMATION ACQUISITION UNIT ~ 302

ROUTE GENERATION UNIT ~ 303

COST CALCULATION UNIT ~ 304

VEHICLE DISPATCH UNIT ~ 305

USER INFORMATION DB ~ 311

VEHICLE INFORMATION DB ~ 312

MAP INFORMATION DB ~ 313

FEE INFORMATION DB ~ 314

SERVER

| USER ID | DEPARTURE LOCATION | DESTINATION | USAGE TIME |
|---------|--------------------|-------------|------------|
| U11 | A1 | B1 | C1 |
| U12 | A2 | B2 | C2 |
| U13 | A3 | B3 | C3 |
| . . . | . . . | . . . | . . . |

FIG. 6

| VEHICLE ID | CURRENT LOCATION | DESTINATION | ROUTE | VEHICLE CATEGORY |
|------------|------------------|-------------|-------|------------------|
| V21 | D1 | E1 | F1 | HEV |
| V22 | D2 | E2 | F2 | PHEV |
| V23 | D3 | E3 | F3 | INTERNAL COMBUSTION ENGINE VEHICLE |
| . . . | . . . | . . . | . . . | . . . |

| REGION | FUEL FEE (¥/kg) | ELECTRIC ENERGY FEE (¥/J) |
|---|---|---|
| JP | × × × | × × × |
| US | × × × | × × × |
| CN | × × × | × × × |
| . . . | . . . | . . . |

BOARDING REQUEST GENERATION UNIT ~ 401

USER TERMINAL

40

| REGION | CO2 EMISSION AMOUNT DURING FUEL CONSUMPTION (g/kg) | CO2 EMISSION AMOUNT DURING ELECTRIC POWER CONSUMPTION (g/J) |
|---|---|---|
| JP | × × × | × × × |
| US | × × × | × × × |
| CN | × × × | × × × |
| . . . | . . . | . . . |

INFORMATION PROCESSING DEVICE AND INFORMATION PROCESSING METHOD

CROSS-REFERENCE TO RELATED APPLICATION

This application claims priority to Japanese Patent Application No. 2021-113630 filed on Jul. 8, 2021, incorporated herein by reference in its entirety.

BACKGROUND

1. Technical Field

The present disclosure relates to an information processing device and an information processing method.

2. Description of Related Art

A technique for determining an operation schedule of an autonomous driving vehicle based on schedule information of a plurality of users and attribute information indicating a mutual relationship of at least a part of the users is known (see, for example, WO 2018/230646).

SUMMARY

An object of the present disclosure is to provide appropriate vehicle dispatch.

An aspect of the present disclosure provides an information processing device including a control unit that executes, when assigning, to each of multiple routes, any of multiple vehicles that is able to travel with a drive source of at least one of an electric motor and an internal combustion engine, categories of the vehicles being different from each other, determining, based on a cost or an environmental load when the vehicle is caused to travel on the routes with the electric motor and a cost or an environmental load when the vehicle is caused to travel on the routes with the internal combustion engine, combinations of the vehicles and the routes.

An aspect of the present disclosure provides an information processing method that executes operations including, when a computer assigns, to each of multiple routes, any of multiple vehicles that is able to travel with a drive source of at least one of an electric motor and an internal combustion engine, categories of the vehicles being different from each other, determining, based on a cost or an environmental load when the vehicle is caused to travel on the routes with the electric motor and a cost or an environmental load when the vehicle is caused to travel on the routes with the internal combustion engine, combinations of the vehicles and the routes.

Another aspect of the present disclosure provides a program for causing a computer to execute a process in the above information processing method, or a storage medium that non-temporarily stores the program.

According to the present disclosure, appropriate vehicle dispatch can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram showing an example of a table configuration of user information stored in a user information database (DB);

FIG. 6 is a diagram showing an example of a table configuration of vehicle information stored in a vehicle information DB:

DETAILED DESCRIPTION OF EMBODIMENTS

Figure 1:
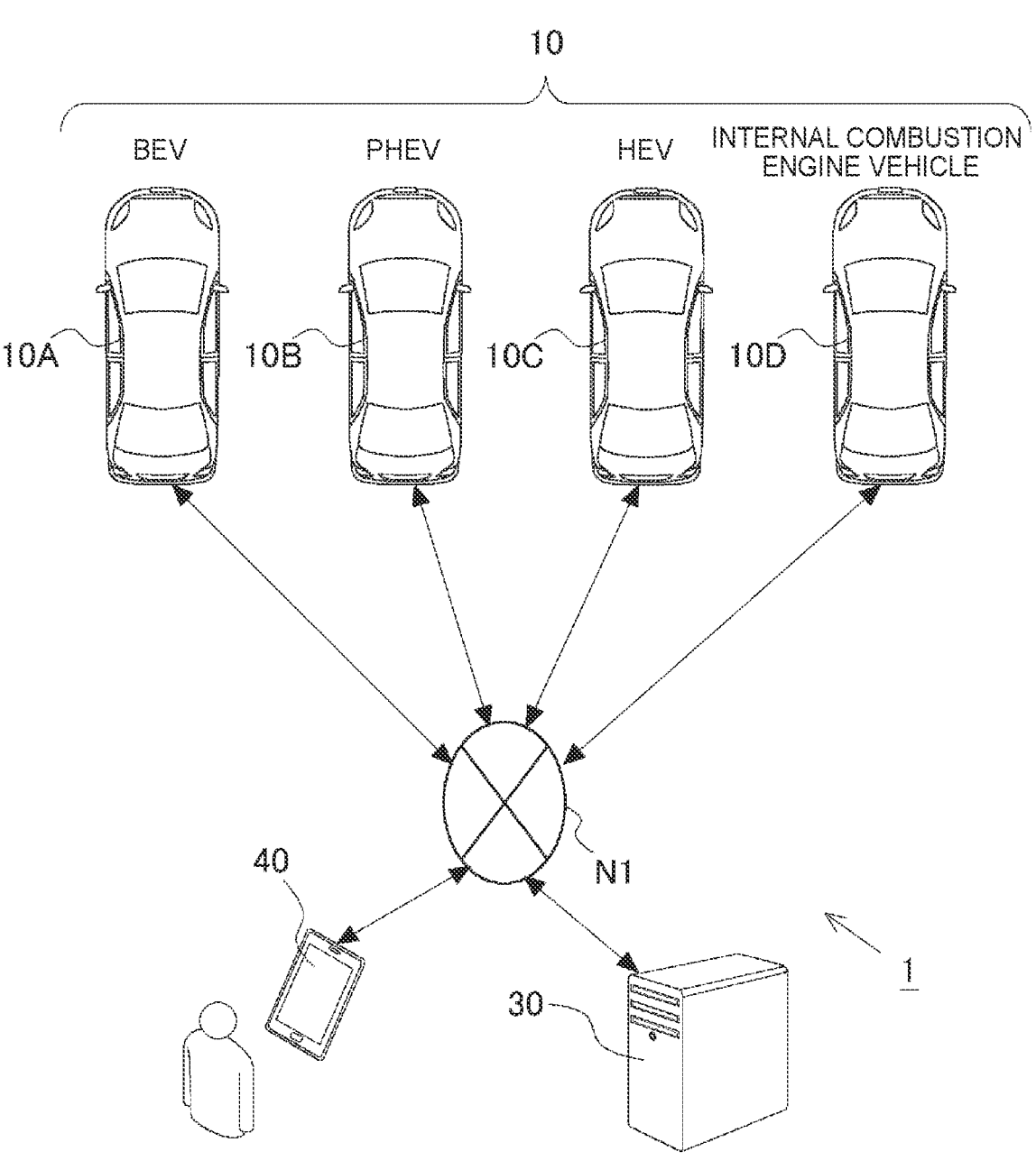
FIG. 1 is a diagram showing a schematic configuration of a system according to an embodiment.

An information processing device that is one of the aspects of the present disclosure includes a control unit. When the control unit assigns, to each of multiple routes, any of multiple vehicles that is able to travel with a drive source of at least one of an electric motor and an internal combustion engine, categories of the vehicles being different from each other, the control unit executes determining, based on a cost or an environmental load when the vehicles are caused to travel on the routes with the electric motor and a cost or an environmental load when the vehicles are caused to travel on the routes with the internal combustion engine, a combination of the vehicles and the routes.

The vehicle may move autonomously or may be moved by being driven by a driver. The vehicle includes, for example, a battery electric vehicle (BEV), a plug-in hybrid electric vehicle (PHEV), a hybrid electric vehicle (HEV), a fuel cell electric vehicle (FCEV), an vehicle capable of traveling only with an internal combustion engine (an internal combustion engine vehicle), and the like. These vehicles are different categories of vehicles. In these vehicles, costs or environmental loads are different even when these vehicles travel on the same road at the same speed. For example, in a region where the cost of fuel for an internal combustion engine is relatively low, the cost for causing a vehicle to travel by actively using the internal combustion engine may be lower. On the other hand, in a region where the cost for electric energy is relatively low, the cost for causing a vehicle to travel by actively using the electric motor may be lower.

In business establishment that manages multiple vehicles, for example, when the fuel fee is relatively low, the cost of the entire system can be reduced by preferentially dispatching the internal combustion engine vehicle. Similarly, for example, when the electric power fee is relatively low, the cost of the entire system can be reduced by preferentially dispatching the BEV. Then, the control unit determines, based on the cost or the environmental load when the vehicles are caused to travel with the electric motor and the cost or then environmental load when the vehicles are caused to travel with the internal combustion engine, a combination of the vehicles and the routes.

The cost may be, for example, a fee paid by a user to cause the vehicle to travel. Further, the environmental load may be the amount of $CO_2$ emitted to cause the vehicle to travel. For example, the control unit may determine a vehicle corresponding to each of the routes such that the fee paid by the user for causing the vehicles to travel on all the routes is lower, and the control unit may determine a vehicle corresponding to each of the routes such that the amount of $CO_2$ emitted to cause the vehicles travel on all the routes is further reduced.

By dispatching the vehicle such that the cost or the environmental load is further reduced, the control unit can reduce the fee paid by the user and the amount of $CO_2$ emitted to cause the vehicle to travel. The $CO_2$ emission amount may be calculated on a well-to-wheel basis (well-to wheel: from an oil field to driving a tire). Here, when the vehicle is traveling with the electric motor, $CO_2$ is not emitted from the vehicle. However, $CO_2$ may be emitted when the electric power consumed by the vehicle is generated at a power plant. The $CO_2$ emission amount at the power plant varies depending on a power generation method. Therefore, even when the vehicle travels under the same travel conditions, the $CO_2$ emission amount on the well-to-wheel basis is different depending on the region or time, for example. By dispatching the vehicle such that the $CO_2$ emission amount on the well-to-wheel basis is further reduced, the $CO_2$ emission amount in the region can be reduced.

The routes are not limited to predetermined routes, and may be generated so as to pass through the positions of users who rideshare in a case of rideshare, for example.

Hereinafter, embodiments of the present disclosure will be described with reference to the drawings. The configurations of the following embodiments are illustrative, and the present disclosure is not limited to the configurations of the embodiments. Further, the following embodiments can be combined as much as possible.

First Embodiment

FIG. 1 is a diagram showing a schematic configuration of a system 1 according to a first embodiment. The system 1 includes one or more vehicles 10, a server 30, and one or more user terminals 40. The system 1 is a system for dispatching a vehicle such that, for example, a fee that a rideshare operator or a taxi operator who manages the vehicles 10 pays is further reduced, that is, a cost is further reduced.

The vehicle 10 includes, for example, a BEV 10A, a PHEV 10B, an HEV 10C, and an internal combustion engine vehicle 10D. The BEV 10A is a vehicle including only an electric motor described below as a drive source. The PHEV 10B is a hybrid electric vehicle capable of charging a battery from a commercial power source, and is a vehicle including an electric motor and an internal combustion engine as a drive source. The HEV 10C is a hybrid electric vehicle incapable of charging a battery from a commercial power source, and is a vehicle including an electric motor and an internal combustion engine as a drive source. Each of the BEV 10A, the PHEV 10B, and the HEV 10C can also charge the battery by regeneration during deceleration. Further, the internal combustion engine vehicle 10D is a vehicle including only an internal combustion engine as a drive source.

Although four categories of vehicles 10 are shown in FIG. 1 as an example, other categories of vehicles (for example, a fuel cell electric vehicle (FCEV)) may be included. Also, it is not necessary to include all categories of the vehicles 10 shown in FIG. 1. Further, in FIG. 1, one vehicle 10 of each category is shown, but multiple vehicles 10 of each category may be shown. Hereinafter, when the category of the vehicle 10 is not distinguished, it is simply referred to as the vehicle 10. The vehicle 10 may be a vehicle capable of autonomous traveling or a vehicle capable of traveling manually by a driver. Further, the vehicle 10 may be a vehicle used for rideshare or a vehicle used for a taxi.

The user terminal 40 is, for example, a terminal owned by a user who uses rideshare or a taxi. The user sends, to the server 30, a request to use the rideshare or the taxi by using the user terminal 40. When the server 30 receives, from the user, the request to use the rideshare or the taxi, the server 30 selects a vehicle 10 and generates a route.

The vehicle 10, the server 30, and the user terminal 40 are connected to each other by a network N1. The network N1 is, for example, a world-wide public communication network such as the Internet, and a wide area network (WAN) or other communication networks may be adopted. In addition, the network N1 may include a telephone communication network such as a mobile phone network or a wireless communication network such as Wi-Fi (registered trademark).

Figure 2:
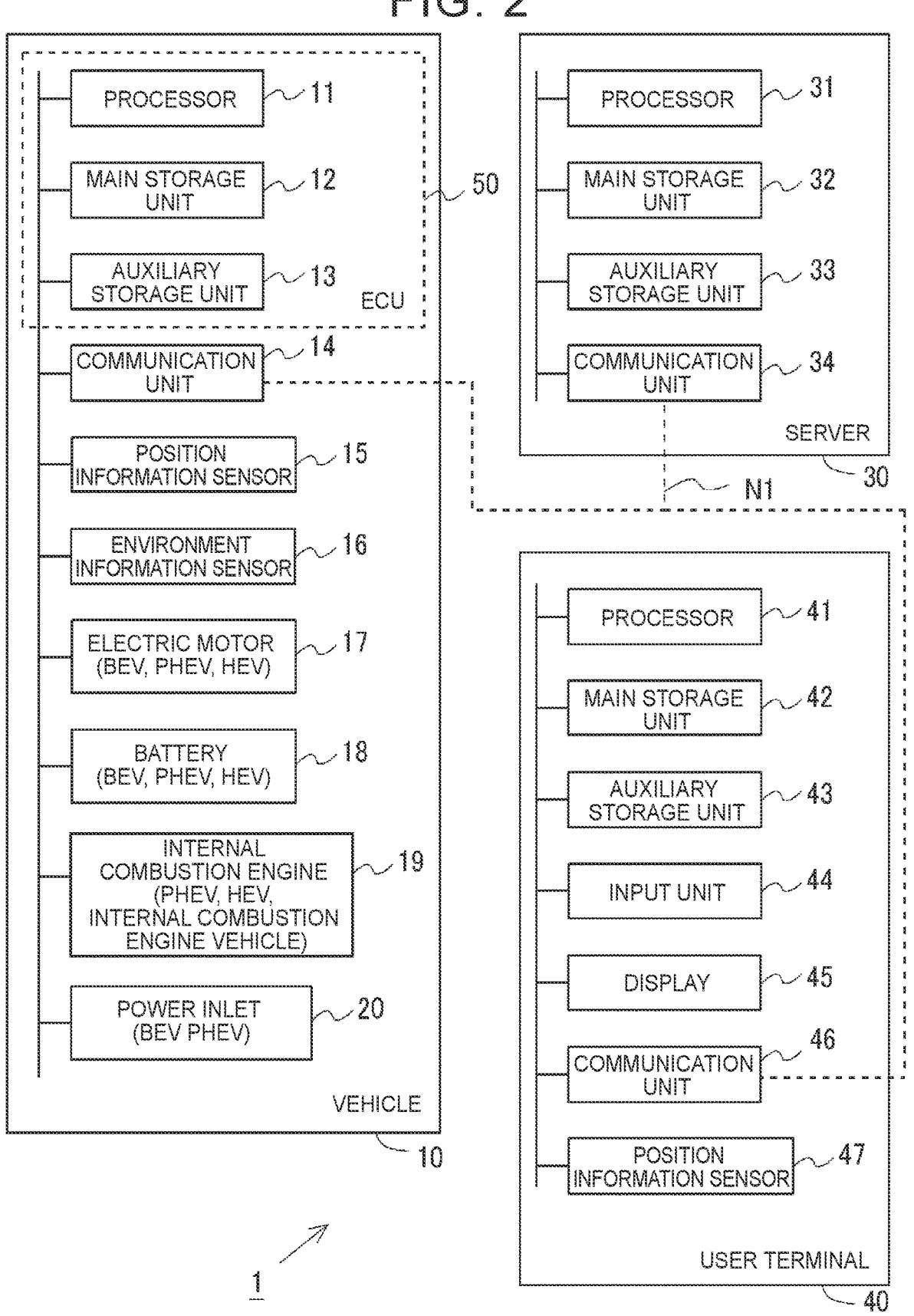
FIG. 2 is a block diagram schematically showing an example of respective configurations of a vehicle, a server, and a user terminal configuring a system according to the embodiment.

Hereinafter, detailed hardware configurations of the vehicle 10, the server 30, and the user terminal 40 will be described with reference to FIG. 2. FIG. 2 is a block diagram schematically showing an example of respective configurations of the vehicle 10, the server 30, and the user terminal 40 configuring the system 1 according to the embodiment.

The vehicle 10 includes an ECU 50, a communication unit 14, a position information sensor 15, an environment information sensor 16, an electric motor 17, a battery 18, an internal combustion engine 19, and a power inlet 20. Hereinafter, it is assumed that the vehicle 10 is a vehicle capable of autonomous traveling.

The ECU 50 has a computer configuration. The ECU 50 drives each control component to control the vehicle 10 based on an output signal, etc. input from various sensors. The ECU 50 includes a processor 11, a main storage unit 12, and an auxiliary storage unit 13. The components are connected to each other by a bus.

The processor 11 is a central processing unit (CPU), a digital signal processor (DSP), or the like. The processor 11 controls the vehicle 10 and performs various information processing calculations. The main storage unit 12 is a random access memory (RAM), a read-only memory (ROM), or the like. The auxiliary storage unit 13 is an erasable programmable ROM (EPROM), a hard disk drive (HDD), a removable medium, or the like. The auxiliary storage unit 13 stores an operating system (OS), various kinds of programs, various kinds of tables, and the like. The processor 11 loads the program stored in the auxiliary storage unit 13 into the work area of the main storage unit 12 and executes the program. Through execution of the program, each component is controlled. As a result, the ECU 50 realizes the function that matches the predetermined purpose. The main storage unit 12 and the auxiliary storage unit 13 are computer-readable recording media. The information stored in the auxiliary storage unit 13 may be stored in the main storage unit 12. Further, the information stored in the main storage unit 12 may be stored in the auxiliary storage unit 13.

The communication unit 14 is means for communicating with the server 30 via the network N1. The communication unit 14 is a circuit for communicating with other devices (for example, the server 30) via the network N1 using wireless communication network such as a mobile communication service (for example, a telephone communication network such as the fifth generation (5G), the fourth generation (4G), the third generation (3G), and long term evolution (LTE)), Wi-Fi (registered trademark), Bluetooth (registered trademark), and the like.

The position information sensor 15 acquires position information (for example, latitude and longitude) of the vehicle 10 at a predetermined cycle. The position information sensor 15 is, for example, a global positioning system (GPS) receiving unit, a wireless communication unit, or the like. The information acquired by the position information sensor 15 is recorded in, for example, the auxiliary storage unit 13 or the like and transmitted to the server 30.

The environment information sensor 16 is means for sensing the state of the vehicle 10 or sensing the periphery of the vehicle 10. Examples of the sensor for sensing the state of the vehicle 10 include a gyroscope sensor, an acceleration sensor, or an azimuth sensor. Examples of the sensor for sensing the periphery of the vehicle 10 include a stereo camera, a laser scanner, a light detection and ranging (LIDAR), a radar, or the like.

The electric motor 17 is, for example, a three-phase alternating current synchronous motor generator. The electric motor 17 has a function as an electric motor that drives the vehicle 10 by receiving electric power supplied from the battery 18. Further, the electric motor 17 can assist the output of the internal combustion engine 19 as needed. Further, the electric motor 17 can generate power by using the energy generated from the internal combustion engine 19, or can generate power by regeneration when the vehicle 10 is decelerated. As a result, the battery 18 can be charged. As another method, in addition to the electric motor 17 that drives the vehicle 10, a generator that generates power by regeneration may be separately provided. The electric motor 17 is mounted on each of the BEV 10A, the PHEV 10B, and the HEV 10C, and is not mounted on the internal combustion engine vehicle 10D.

The battery 18 is a secondary battery that can be charged and discharged, such as a nickel-cadmium storage battery, a nickel-hydrogen storage battery, or a lithium ion battery. The battery 18 is electrically connected to the electric motor 17 via an inverter or the like such that the charging power of the battery 18 is supplied to the electric motor 17 to be able to drive the electric motor 17 for power running and the generated power of the electric motor 17 can be charged to the battery 18. Therefore, the battery 18 is mounted on each of the BEV 10A, the PHEV 10B, and the HEV 10C, and is not mounted on the internal combustion engine vehicle 10D. However, the internal combustion engine vehicle 10D is equipped with, for example, a small battery for operating a starter or the like. The storage capacity of the battery 18 is the largest for the BEV 10A, and decreases in the order of the PHEV 10B and the HEV 10C.

The internal combustion engine 19 combusts fuel in a cylinder to generate power for rotating an output shaft connected to a crankshaft. Each cylinder of the internal combustion engine 19 is provided with a fuel injection valve for injecting the fuel. The fuel injection valve is connected to the ECU 50 via an electric wire, and opening/closing timing of the fuel injection valve is controlled by the ECU 50. The fuel is, for example, gasoline or light oil. The internal combustion engine 19 is mounted on each of the PHEV 10B, the HEV 10C, and the internal combustion engine vehicle 10D, and is not mounted on the BEV 10A.

The power inlet 20 is a unit for receiving electric power supplied from the outside of the vehicle 10. The battery 18 is charged by this electric power. The power inlet 20 is mounted on each of the BEV 10A and the PHEV 10B, and is not mounted on the HEV 10C and the internal combustion engine vehicle 10D.

Next, the hardware configuration of the server 30 will be described. The server 30 has a computer configuration. The server 30 includes a processor 31, a main storage unit 32, an auxiliary storage unit 33, and a communication unit 34. The components are connected to each other by a bus. The processor 31, the main storage unit 32, and the auxiliary storage unit 33 are similar to the processor 11, the main storage unit 12, and the auxiliary storage unit 13 of the vehicle 10, respectively, and thus the description thereof will be omitted. The processor 31 is an example of the control unit.

The communication unit 34 is a means for communicating with the vehicle 10 and the user terminal 40 via the network N1. The communication unit 34 is, for example, a local area network (LAN) interface board or a wireless communication circuit for wireless communication. The LAN interface board or the wireless communication circuit is connected to the network N1.

Next, the user terminal 40 will be described. The user terminal 40 is a small computer such as a smartphone, a mobile phone, a tablet terminal, a personal information terminal, a wearable computer (smart watch, for example), or a personal computer (PC). The user terminal 40 includes a processor 41, a main storage unit 42, an auxiliary storage unit 43, an input unit 44, a display 45, a communication unit 46, and a position information sensor 47. The components are connected to each other by a bus. The processor 41, the main storage unit 42, the auxiliary storage unit 43, the communication unit 46, and the position information sensor 47 are similar to the processor 11, the main storage unit 12, the auxiliary storage unit 13, the communication unit 14, and the position information sensor 15 of the vehicle 10, respectively, and thus the description thereof will be omitted. The information acquired by the position information sensor 47 is recorded in, for example, the auxiliary storage unit 43 or the like and transmitted to the server 30.

The input unit 44 is a means for receiving an input operation performed by the user, and is, for example, a touch panel, a mouse, a keyboard, a push button, or the like. The display 45 is a means for presenting information to the user, for example, a liquid crystal display (LCD), an electroluminescence (EL) panel, or the like. The input unit 44 and the display 45 may be configured as one touch panel display.

Figure 3:
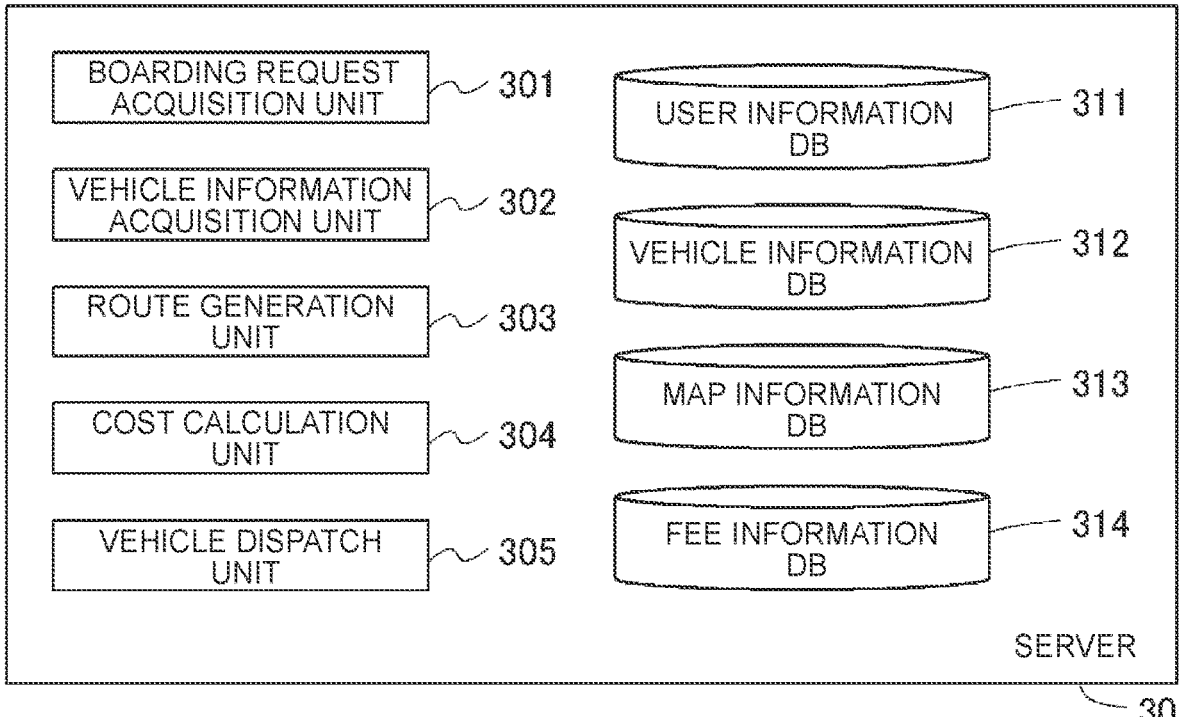
FIG. 3 is a diagram showing an example of a functional configuration of the server.

Next, the function of the server 30 will be described. FIG. 3 is a diagram showing an example of a functional configuration of the server 30. The server 30 includes, as functional components, a boarding request acquisition unit 301, a vehicle information acquisition unit 302, a route generation unit 303, a cost calculation unit 304, a vehicle dispatch unit 305, a user information DB 311, a vehicle information DB 312, a map information DB 313, and a fee information DB 314. The processor 31 of the server 30 executes the processes of the boarding request acquisition unit 301, the vehicle information acquisition unit 302, the route generation unit 303, the cost calculation unit 304, and the vehicle dispatch unit 305 by a computer program on the main storage unit 32. However, any of the functional components or part of the processes thereof may be executed by a hardware circuit.

The user information DB 311, the vehicle information DB 312, the map information DB 313, and the fee information DB 314 are established when the program of a database management system (DBMS) executed by the processor 31 manages the data stored in the auxiliary storage unit 33. The user information DB 311, the vehicle information DB 312, the map information DB 313, and the fee information DB 314 are, for example, relational databases.

Note that any of the functional components of the server 30 or part of the processes thereof may be executed by another computer connected to the network N1.

The boarding request acquisition unit 301 acquires a boarding request from the user terminal 40 of a user who wishes to move using the vehicle 10, for example. The boarding request is information including an identifier (user identification (ID)) of the user and information for the user to request the use of the vehicle 10. The boarding request is generated in the user terminal 40. The boarding request includes information on a user ID, a departure location, a destination, a usage time, and the like (the information is also referred to as user information below). The departure location may be a current location detected by the user terminal 40. When the boarding request acquisition unit 301 acquires the boarding request, the user information included in the boarding request is stored in the user information DB 311 described below.

The vehicle information acquisition unit 302 acquires information on the vehicle 10. Hereinafter, the information on the vehicle 10 is also referred to as vehicle information. The vehicle information includes, for example, information on a current location, a destination, a vehicle category, and a route of the vehicle 10. The current location of the vehicle 10 is acquired based on position information transmitted from the vehicle 10. The destination and the route of the vehicle 10 are generated by the server 30 in response to the boarding request. The vehicle category is information indicating a category of the HEV, the PHEV, the BEV, the internal combustion engine vehicle, etc., and is input by, for example, an administrator of the server 30. The vehicle information acquisition unit 302 stores the vehicle information in the vehicle information DB 312 described below.

The route generation unit 303 generates a route of the vehicle 10. The route generation unit 303 generates a route such that, for example, the vehicle 10 departs from a base and returns to the base via the departure location and the destination of the user. Instead of the base of the vehicle 10, the current location of the vehicle 10 may be used as the departure location of the vehicle 10. The route is generated based on map information stored in the map information DB 313 described below. The route is generated so as to be a route pursuant to a predetermined rule, such as a route with the shortest moving distance of the vehicle 10 or a route with the shortest moving time of the vehicle 10. A well-known technique can be used to generate the route.

The cost calculation unit 304 calculates the cost assuming that each vehicle 10 travels on each route. The cost calculation unit 304 calculates a fee paid by a business operator when it is assumed that each vehicle 10 travels on each route generated by the route generation unit 303 for all combinations of the routes and the vehicles 10. The calculation may be performed, for example, for the number of times at which the boarding request has been made at a fixed time every day, or may be performed each time the boarding request is made.

The fee calculated by the cost calculation unit 304 includes a fee of fuel for the internal combustion engine 19 (fuel fee) and a fee corresponding to the electric energy when the battery 18 is charged with a commercial power source (electric energy fee). Further, the fee calculated by the cost calculation unit 304 can include a fee of fuel required to charge the battery 18 by driving the internal combustion engine 19 in the HEV 10C and the PHEV 10B.

The fuel fee and the electric energy fee may be calculated as, for example, a fee when each vehicle 10 travels on each route assuming that the vehicle 10 travels under a predetermined travel condition (may be a predetermined speed and a predetermined load). The predetermined travel condition may be set according to the speed limit of each road on the route, or may be set according to the data when the vehicle traveled on the same road in the past. Further, a predetermined speed may be set according to the attributes of the road (for example, a highway, a main road, a residential area, a speed limit, an uphill, a downhill, etc.). When the attributes of the road change in the middle of the route, the fuel fee and the electric energy fee may be calculated based on the travel condition for each attribute of the road.

Figure 4:
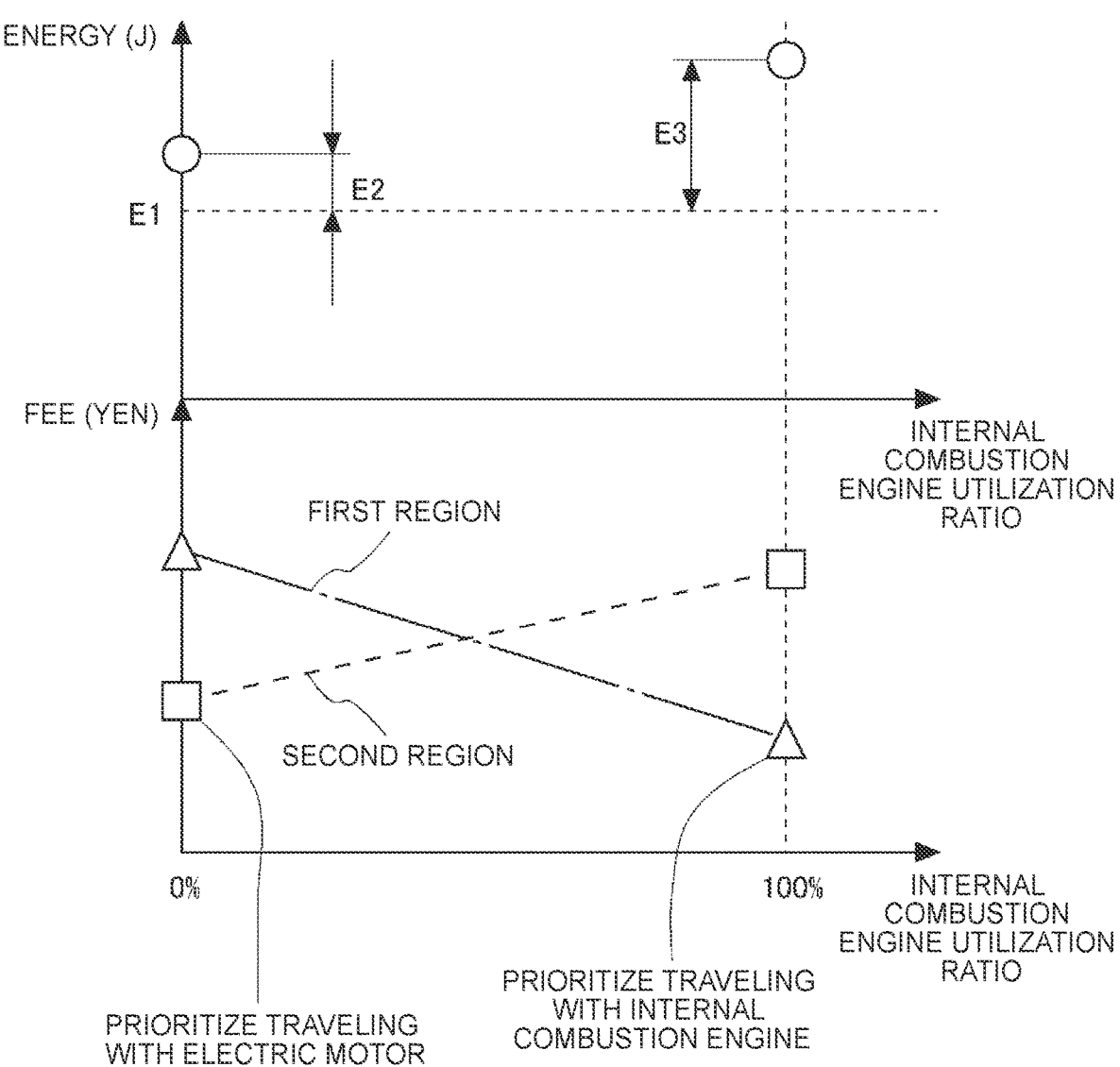
FIG. 4 is a diagram for describing comparison of costs.

FIG. 4 is a diagram for describing comparison of costs. FIG. 4 shows a relationship between an energy (J) and a fee (yen) with respect to the utilization ratio (%) of the internal combustion engine 19. When the utilization ratio in the horizontal axis is 0%, the utilization ratio of the internal combustion engine 19 is 0%, and the vehicle travels without using the internal combustion engine 19, that is, the vehicle travels only with the electric motor 17. Further, when the utilization ratio in the horizontal axis is 100%, the utilization ratio of the internal combustion engine 19 is 100%, and the vehicle travels only with the internal combustion engine 19. FIG. 4 shows a case in which the vehicle 10 is constantly traveling at, for example, 30 km/h.

E1 in FIG. 4 shows the energy per unit distance that is minimum required for the vehicle 10 to travel. E2 shows the energy corresponding to a decrease in efficiency per unit distance when the vehicle 10 travels with the electric motor 17. E2 is a decrease in the energy associated with the efficiency of the battery 18 and the efficiency of the vehicle 10. Further, E3 shows the energy per unit distance corresponding to a decrease in efficiency when the vehicle 10 travels with the internal combustion engine 19. E3 is a decrease in the energy associated with the efficiency of the internal combustion engine 19 and the efficiency of the vehicle 10.

Depending on the travel condition and the vehicle 10, the minimum energy required for traveling and the energy corresponding to the decrease inefficiency when traveling with each drive source vary. For example, the auxiliary storage unit 33 stores the relationship between the travel condition and the minimum energy required for traveling, and the relationship between the travel condition and the energy corresponding to the decrease in efficiency when traveling with each drive source. The travel condition may be, for example, the speed of the vehicle 10 and the load of the vehicle 10.

In the example shown in FIG. 4, when the vehicle 10 travels only with the electric motor 17 (that is, when the internal combustion engine utilization ratio is 0%), the sum of E1 and E2 (E1+E2) corresponds to the energy consumed when the vehicle 10 travels. On the other hand, when the vehicle 10 travels only with the internal combustion engine 19 (that is, when the internal combustion engine utilization ratio is 100%), the sum of E1 and E3 (E1+E3) corresponds to the energy consumed when the vehicle 10 travels.

Next, based on the energy consumed when the vehicle 10 travels with the electric motor 17 and the energy consumed when the vehicle 10 travels with the internal combustion engine 19, the fee required when the vehicle 10 travels with each drive source is calculated. Here, the fuel fee and the electric power fee may change depending on the region and time. Therefore, in FIG. 4, as an example, the fee required when the vehicle 10 travels with each drive source is calculated for each of a first region and a second region. For example, the fee (yen) per unit distance when the vehicle 10 travels with the electric motor 17 can be calculated by multiplying the consumption energy (J) by the electric energy fee (yen/J). That is, the fee is calculated by the following formula.

Fee (yen)=consumption energy (J)×electric energy fee (yen/J)

The consumption energy in this case corresponds to the above E1+E2. For the consumption energy and the electric energy fee, the values stored in the auxiliary storage unit 33 are used.

The consumption energy varies depending on the speed and load of the vehicle 10. By integrating the fee per unit distance with the distance of the route, it is possible to obtain the fee when the vehicle 10 travels on the route with the electric motor 17.

On the other hand, for example, the fee (yen) per unit distance when the vehicle 10 travels with the internal combustion engine 19 can be calculated by multiplying a value obtained by dividing the consumption energy (J) by the heat generation amount of the fuel (J/kg) by the fuel fee (yen/kg). That is, the fee is calculated by the following formula.

Fee (yen)=consumption energy (J)÷heat generation amount of fuel (J/kg)×fuel fee (yen/J)

The consumption energy in this case corresponds to the above E1+E3. For the consumption energy, the heat generation amount of fuel, and the fuel fee, the values stored in the auxiliary storage unit 33 are used. The consumption energy in this case also varies depending on the speed and load of the vehicle 10.

By integrating the fee per unit distance with the distance of the route, it is possible to obtain the fee when the vehicle 10 travels on the route with the internal combustion engine 19.

The information on the electric energy fee and the fuel fee is acquired by the cost calculation unit 304 from the Web server that manages the information at predetermined time intervals, and stored in the fee information DB 314 described below.

In the first region shown in FIG. 4, the fee is higher when the vehicle 10 travels only with the electric motor 17 than when the vehicle 10 travels only with the internal combustion engine 19. Therefore, for example, in a case of a route in which the vehicle 10 constantly travels at 30 km/h in the first region, the cost is lower when the vehicle 10 capable of traveling with the internal combustion engine 19 is preferentially dispatched. On the other hand, in the second region shown in FIG. 4, the fee is lower when the vehicle 10 travels only with the electric motor 17 than when the vehicle 10 travels only with the internal combustion engine 19. Therefore, in a case of a route in which the vehicle 10 constantly travels at 30 km/h in the second region, the cost is lower when the vehicle 10 capable of traveling with the electric motor 17 is preferentially dispatched.

For each of the PHEV 10B and the HEV 10C, the fee may be calculated assuming that the internal combustion engine utilization ratio in FIG. 4 is a predetermined value. In this case, the HEV 10C may have a higher internal combustion engine utilization ratio than the PHEV 10B.

Further, as another method, for each of the PHEV 10B and the HEV 10C, for example, the fee may be calculated assuming that the internal combustion engine 19 operates according to the travel condition. For example, the data of the travel condition for each road may be acquired and stored in the auxiliary storage unit 33, and the fee may be calculated assuming that the internal combustion engine 19 operates according to the travel condition. As the data of the travel condition, the data of another vehicle 10 that has traveled on the same road in the past may be accumulated, and for example, an average value may be obtained and used. Further, the travel condition may be estimated from the speed limit or the like of each road. In this case, it may be assumed that the vehicle 10 is constantly driven at the speed limit of the road. Further, for example, on a highway, it may be considered that the internal combustion engine 19 operates. Further, when the travel distance becomes long and the remaining charge of the battery 18 can be equal to or less than a predetermined value, it may be considered that the internal combustion engine 19 operates to charge the battery 18. In this case, the remaining amount of the battery 18 may be estimated simply according to the travel distance, or the remaining amount of the battery 18 may be estimated according to the travel distance and the travel condition.

Further, as another method, for example, the fuel fee and the electric energy fee per unit distance when each vehicle 10 travels are stored in the auxiliary storage unit 33 in advance, and the cost when each vehicle 10 travels on each route may be calculated based on the route distance, and the fuel fee and the electric energy fee per unit distance. In this case, the fuel fee and the electric energy fee per unit distance differ depending on the region and time.

The cost calculation unit 304 calculates the cost corresponding to each vehicle 10 for all the routes. Then, when each vehicle 10 is assigned to each route, the cost calculation unit 304 extracts the combination of the vehicle 10 and the route (that may be the user or the user terminal 40) in which the total of the fuel fee and the electric energy fee is minimum. As described above, the combination of the vehicle 10 and the route is determined in which the cost as a whole of the system 1 is minimum.

As another method, in a region and time at which the fuel fee per unit distance is lower than the electric energy fee, the combination of the vehicle 10 and the route may be generated by setting the priority of the internal combustion engine vehicle 10D to the highest priority, and lowering the priority in the order of the HEV 10C, the PHEV 10B, and the BEV 10A. In this case, for example, the internal combustion engine vehicle 10D is combined with a route in the order of a route having the longer distance, and after the routes for the number of internal combustion engine vehicles 10D are determined, the HEV 10C is combined to a route next. This is repeated and the vehicle is combined with the route in the order of the PHEV 10B and the BEV 10A. On the other hand, in a region and time at which the electric energy fee per unit distance is lower than the fuel fee, the combination of the vehicle 10 and the route may be generated by setting the priority of the BEV 10A to the highest priority, and lowering the priority in the order of the PHEV 10B, the HEV 10C, and the internal combustion engine vehicle 10D. In this case, for example, the BEV 10A is combined with a route in the order of a route having the longer distance, and after the routes for the number of the BEV 10A are determined, the PHEV 10B is combined to a route next. This is repeated and the vehicle is combined with the route in the order of the HEV 10C and the internal combustion engine vehicle 10D.

In the above description, for the PHEV 10B, the fee is calculated assuming that the internal combustion engine utilization ratio in FIG. 4 is a predetermined value. On the other hand, as another method, the control for switching the drive source may be updated in the PHEV 10B such that the fee becomes lower.

For example, in the first region shown in FIG. 4, the drive source is switched such that the internal combustion engine 19 is prioritized when the vehicle 10 travels. Further, in the second region shown in FIG. 4, the drive source is switched such that the electric motor 17 is prioritized when the vehicle 10 travels. Here, in the PHEV 10B, in general, the lower the speed of the vehicle 10 or the lower the load of the vehicle 10, the higher the efficiency of the electric motor 17. Therefore, for example, when the speed of the vehicle 10 becomes high, or when the load of the vehicle 10 becomes high, the drive source is switched from the electric motor 17 to the internal combustion engine 19. By changing the speed or the load of the vehicle 10 in which the drive source is switched, the vehicle 10 can be controlled such that the fuel fee and the electric energy fee are reduced.

For example, in a region where the fuel fee is relatively low, the fee paid by the business operator can be reduced by preferentially using the internal combustion engine 19. In this case, for example, an operating region in which the internal combustion engine 19 is selected as the drive source is expanded. That is, the speed or the load of the vehicle 10 in which the drive source is switched from the electric motor 17 to the internal combustion engine 19 is reduced. In this case, for example, when the vehicle dispatch unit 305 generates an operation command, the vehicle dispatch unit 305 may include and generate a command for switching the drive source and transmit the command to the vehicle 10.

For example, in a region where the electric energy fee is relatively low, the fee paid by the business operator can be reduced by preferentially using the electric motor 17. In this case, for example, an operating region in which the electric motor 17 is selected as the drive source is expanded. That is, the speed or the load of the vehicle 10 in which the drive source is switched from the electric motor 17 to the internal combustion engine 19 is increased.

For example, in the example of the first region and the second region in FIG. 4, the fee when the vehicle 10 travels with the electric motor 17 is lower in the second region than in the first region, so that the operating region in which the vehicle 10 travels with the electric motor 17 is expanded in the second region as compared with the first region. As a result, for example, the speed or the load of the vehicle 10 in which the drive source is switched from the electric motor 17 to the internal combustion engine 19 is increased in the second region than in the first region.

Further, regarding the HEV 10C as well, the travel condition in which the electric motor 17 and the internal combustion engine 19 are switched may be changed such that the cost can be further reduced between a case in which the vehicle 10 travels with the internal combustion engine 19 and a case in which the vehicle 10 travels with the electric motor 17 using electric power generated by the internal combustion engine 19.

Then, the vehicle dispatch unit 305 dispatches the vehicle such that the combination of the vehicle and the route is a combination with the lowest cost calculated by the cost calculation unit 304. The vehicle dispatch unit 305 generates an operation command including the route generated by the route generation unit 303 and transmits the operation command to each vehicle 10.

The user information DB 311 is provided by storing the user information in the auxiliary storage unit 33 described above. Here, the configuration of the user information stored in the user information DB 311 will be described based on FIG. 5. FIG. 5 is a diagram showing an example of a table configuration of the user information stored in the user information DB 311. The table of the information stored in the user information DB 311 includes fields for the user ID, the departure location, the destination, and the usage time. Identification information (user ID) for identifying the user is input in the user ID field. The user ID is assigned to each user by the boarding request acquisition unit 301. Information indicating the departure location of the user is input in the departure location field. Information indicating the destination of the user is input in the destination field. Information on the date and time when the user uses the vehicle 10 is input in the usage time field. These kinds of information are transmitted from the user terminal 40 to the server 30. In the departure location field, the position information transmitted from the user terminal 40 may be input. Further, the departure location and the destination may be indicated by, for example, latitude and longitude, or may be indicated by an address, the name of a building, or the like.

The vehicle information DB 312 is provided by storing information (vehicle information) on the movement of the vehicle 10 in the auxiliary storage unit 33. Here, the configuration of the vehicle information stored in the vehicle information DB 312 will be described based on FIG. 6. FIG. 6 is a diagram showing an example of a table configuration of the vehicle information stored in the vehicle information DB312. The table of the vehicle information includes fields for the vehicle ID, the current location, the destination, the route, and the vehicle category. Identification information (vehicle ID) for identifying the vehicle is input in the vehicle ID field. Information indicating the current location of the vehicle 10 is input in the current location field. Information indicating the final destination when the vehicle 10 moves is input in the destination field. The current location and the destination of the vehicle 10 are indicated by, for example, latitude and longitude. Information indicating the route of the vehicle 10 is input in the route field. A route corresponding to the combination determined by the cost calculation unit 304 is input in the route field. The route is a route for the vehicle 10 to move to the destination stored in the destination field, and is a route generated by the route generation unit 303. Information on the category of the vehicle 10 corresponding to the drive source of the vehicle 10 is input in the vehicle category field. Information that allows the user to determine whether the vehicle 10 is the BEV, the PHEV, the HEV, or the internal combustion engine vehicle is input in the vehicle category field.

In the map information DB 313, as map information, for example, link data related to a road (link), node data related to a node point, intersection data related to each intersection, search data for searching a route, facility data related to a facility, search data for searching a point, and the like are stored. Further, information on the speed limit, etc. corresponding to each road or information on the attributes of each road may be stored.

Figures 7, 8:
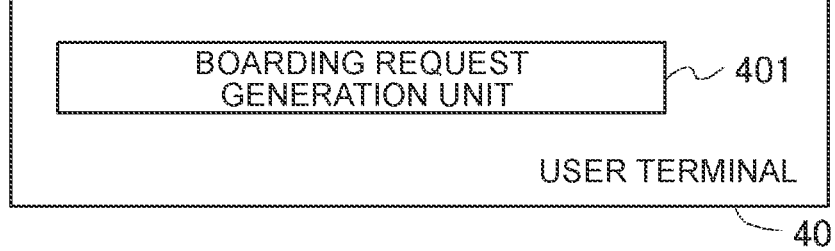
FIG. 7 is a diagram showing an example of a table configuration of fee information stored in a fee information DB.
FIG. 8 is a diagram showing an example of a functional configuration of the user terminal.

The fee information DB 314 is provided by storing the fee information in the auxiliary storage unit 33. FIG. 7 is a diagram showing an example of a table configuration of the fee information stored in the fee information DB 314. The table of the fee information includes fields for the region, the fuel fee, and the electric energy fee. Information on a country is, for example, input in the region field. This is because the fuel fee and the electric energy fee are considered to differ from country to country. The region may be classified according to an administrative division smaller than the country. Further, the region is not limited to the administrative division, and for example, a mesh code or the like may be input in the region field. Information on the fuel fee of the internal combustion engine 19 is input in the fuel fee field. As the information on the fuel fee, for example, information on the fee per 1 kg of the fuel (yen/kg) is input. Information on the fee corresponding to the electric energy for charging the battery 18 is input in the electric energy fee field. As the information on the electric energy fee, for example, information on the fee per 1 J of the electric energy (yen/J) is input. The fuel fee correlates with the fee when the business operator purchases fuel at a gas station, for example, and the electric energy fee correlates with the fee paid by the business operator when the battery 18 is charged with a commercial power source, for example.

Next, the function of the user terminal 40 will be described. FIG. 8 is a diagram illustrating a functional configuration of the user terminal 40. The user terminal 40 includes a boarding request generation unit 401 as a functional component. The processor 41 of the user terminal 40 executes the process of the boarding request generation unit 401 using a computer program stored in the main storage unit 42. However, a part of the process of the boarding request generation unit 401 may be executed by a hardware circuit.

The boarding request generation unit 401 outputs an operation screen to the display 45, for example, and generates a boarding request in response to an input by the user to the input unit 44 of the user terminal 40. The generated boarding request is transmitted to the server 30 by the boarding request generation unit 401. The boarding request includes the user information (for example, the departure location, the destination, and the usage time). The user inputs the user information via the input unit 44. The departure location is a point where the user wishes to board the vehicle. The destination is a point where the user wishes to get off the vehicle. The usage time is date and time when the user wishes to board the vehicle. When the point where the vehicle 10 stops is determined in advance, the departure location and the destination may be selected from points where the vehicle 10 stops. Further, when the vehicle 10 is operated according to the timetable, the usage time may be selected according to the timetable. The boarding request generation unit 401 generates, for example, the boarding request according to the input from the user and transmits the boarding request to the server 30. The boarding request generation unit 401 may transmit the position information acquired by the position information sensor 47 to the server 30 as the departure location.

Figure 9:
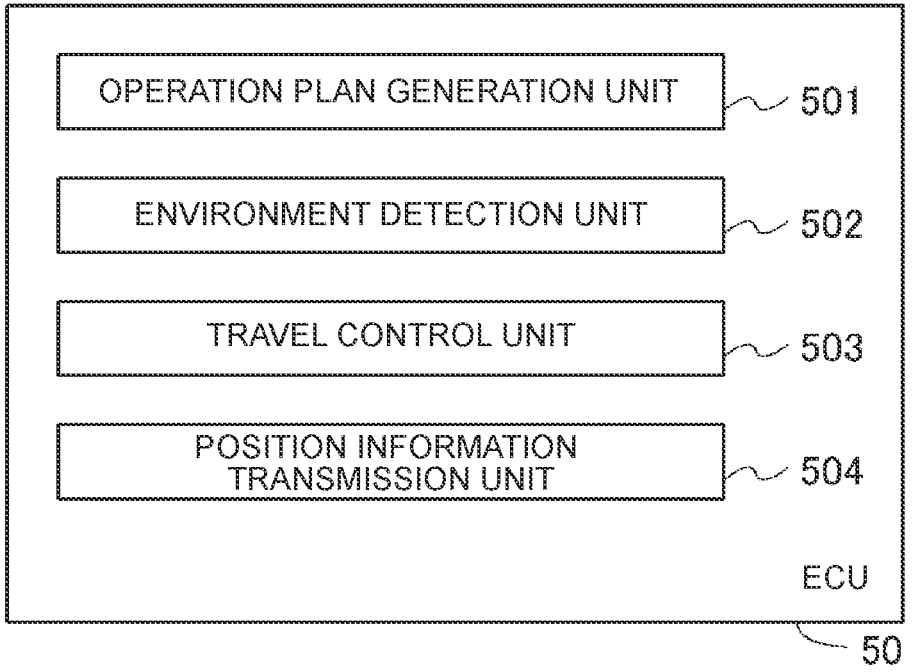
FIG. 9 is a diagram showing a functional configuration of an electronic control unit (ECU)

Next, the function of the ECU 50 of the vehicle 10 will be described. The vehicle 10 described below is an autonomous traveling vehicle. FIG. 9 is a diagram showing a functional configuration of the ECU 50. The ECU 50 includes an operation plan generation unit 501, an environment detection unit 502, a travel control unit 503, and a position information transmission unit 504, as functional components. The processor 11 of the ECU 50 executes the processes of the operation plan generation unit 501, the environment detection unit 502, the travel control unit 503, and the position information transmission unit 504 by a computer program stored in the main storage unit 12. However, any of the functional components or part of the processes thereof may be executed by a hardware circuit. Note that any of the functional components of the ECU 50 or part of the processes thereof may be executed by another computer connected to the network N1.

The operation plan generation unit 501 acquires the operation command from the server 30 and generates the operation plan of the vehicle 10. The operation command includes information on the route of the vehicle 10. The operation plan generation unit 501 calculates the route of the vehicle 10 based on the operation command provided by the server 30 and generates the operation plan for moving on the route.

The environment detection unit 502 detects the environment around the vehicle 10 that is necessary for autonomous traveling, based on the data acquired by the environment information sensor 16. Objects to be detected include, for example, the number and the positions of lanes, the number and the positions of other moving bodies around the vehicle 10, the number and the positions of obstacles around the vehicle 10 (pedestrians, bicycles, structures, buildings, etc.), the structure of the road, road signs, and the like, but not limited to these. Any object may be detected as long as it is necessary for autonomous traveling. For example, when the environment information sensor 16 is a stereo camera, image data taken thereby is subjected to image processing to detect the objects around the vehicle 10. Data about the surrounding environment of the vehicle 10 (hereinafter, environmental data) detected by the environment detection unit 502 is transmitted to the travel control unit 503 described below.

The travel control unit 503 generates a control command for controlling autonomous traveling of the vehicle 10, based on the operation plan generated by the operation plan generation unit 501, the environmental data generated by the environment detection unit 502, and the position information of the vehicle 10 that is acquired by the position information sensor 15. For example, the travel control unit 503 generates the control command to cause the vehicle 10 to travel along a predetermined route while suppressing obstacles from entering a predetermined safety area around the vehicle 10. The generated control command is transmitted to the electric motor 17, the internal combustion engine 19, or the like. A known method can be adopted as a method of generating the control command for causing the vehicle 10 to travel autonomously. Further, a known method can be also adopted as for a method of controlling the BEV 10A, the PHEV 10B, the HEV 10C, and the internal combustion engine vehicle 10D.

The position information transmission unit 504 transmits the position information acquired from the position information sensor 15 to the server 30 via the communication unit 14. The timing at which the position information transmission unit 504 transmits the position information can be set as appropriate, and for example, the position information may be transmitted periodically, may be transmitted in synchronization with the timing of transmitting some information to the server 30, or may be transmitted in response to a request from the server 30. The position information transmission unit 504 transmits the position information to the server 30 together with the vehicle ID.

Figure 10:
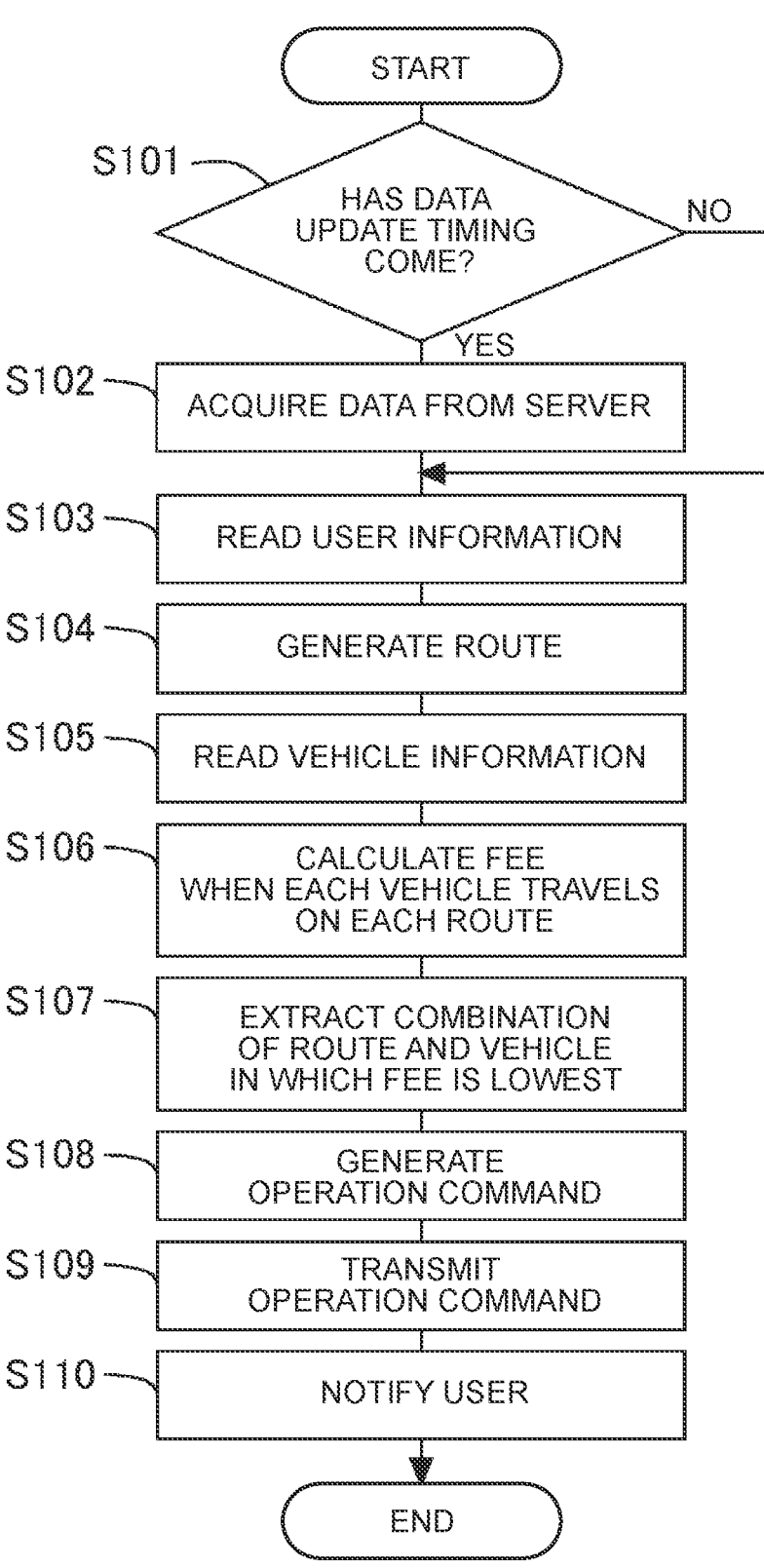
FIG. 10 is a flowchart of a vehicle dispatch process according to a first embodiment.

Next, a vehicle dispatch process in the server 30 will be described. FIG. 10 is a flowchart of the vehicle dispatch process according to the first embodiment. The vehicle dispatch process shown in FIG. 10 is executed at the server 30 at predetermined time intervals. In addition, a description will be given assuming that the boarding request has already been acquired from the user terminal 40.

In step S101, the cost calculation unit 304 determines whether data update timing has come. This data is data for calculating a fee when the vehicle travels with each drive source (the electric motor 17 or the internal combustion engine 19), and is fee information stored in the fee information DB 314. This data is updated periodically. When the determination result is Yes in step S101, the process proceeds to step S102, and when the determination result is No, the process proceeds to step S103.

In step S102, the cost calculation unit 304 acquires the data from an external server. The cost calculation unit 304 accesses the external server and acquires the data for calculating the fee when the vehicle travels with each drive source (the electric motor 17 or the internal combustion engine 19). At this time, the cost calculation unit 304 acquires data according to each region. That is, the cost calculation unit 304 acquires information on the fee and stores the information in the fee information DB 314 according to the region where the vehicle 10 is charged or refueled.

In step S103, the route generation unit 303 reads the user information from the user information DB 311. In step S104, the route generation unit 303 generates a route corresponding to each user based on the user information of each user. The route generation unit 303 generates, for example, a route such that the vehicle moves from the departure location of the user to the destination of the user in the shortest distance or the shortest time. The routes are generated for all users. The route may be generated on the premise that the same vehicle 10 is used by a plurality of users for rideshare.

In step S105, the cost calculation unit 304 reads the vehicle information from the vehicle information DB 312. In step S106, the cost calculation unit 304 calculates, for each vehicle 10 on each route, the fee paid by the business operator when each vehicle 10 travels on each route generated in step S104. The cost calculation unit 304 calculates the fees for all combinations of the routes and the vehicles 10.

In step S107, the cost calculation unit 304 extracts the combination of the route and the vehicle 10 in which the fee generated in each of the vehicles 10 is the lowest, based on the fee for each vehicle 10 on each route calculated in step S106. Then, in step S108, the vehicle dispatch unit 305 generates an operation command such that each vehicle 10 travels on the corresponding route based on the extracted combination. The operation command is generated for each vehicle 10. At this time, the travel condition in which the drive sources of the PHEV 10B and the HEV 10C are switched may be included in the operation command.

In step S109, the vehicle dispatch unit 305 transmits the operation command generated in step S108 to each vehicle 10. For each vehicle 10 that has received the operation command, an operation plan is generated according to the operation command. Then, in step S110, the vehicle dispatch unit 305 notifies the user terminal 40 of information on the vehicle 10. For example, information for notifying the user terminal 40 of the number, the color, the category, the feature, etc. of the vehicle 10 is transmitted. The user terminal 40 that has received this notification causes the display 45 to display the information on the vehicle 10.

As described above, according to the first embodiment, the vehicle is dispatched such that the travel cost of the vehicles 10 is the lowest as a whole of the system 1, and thus the travel cost of the vehicles 10 can be reduced.

Second Embodiment

The system 1 according to a second embodiment is a system that dispatches a vehicle to a user such that the $CO_2$ emission amount as a whole of the system 1 is further reduced, that is, the environmental load is further reduced. In the first embodiment, the combination of the route and the vehicle 10 is extracted such that the fee paid by the business operator as a whole of the system 1 is further reduced. On the other hand, in the second embodiment, the combination of the route and the vehicle 10 is extracted such that the $CO_2$ emission amount as a whole of the system 1 is further reduced. Since the hardware configurations of the vehicle 10, the server 30, and the user terminal 40 are the same as those in the first embodiment, the description thereof will be omitted.

In recent years, there has been a demand for reduction of the $CO_2$ emission amount from the viewpoint of carbon neutrality. Here, the $CO_2$ emissions are not limited to the emissions from the vehicle 10 when the vehicle 10 travels, and $CO_2$ is also emitted, for example, during transportation for transporting fuel to a gas station. Further, even when the vehicle travels with the electric motor 17, $CO_2$ may be emitted in order to generate the required electric power. Therefore, it is desired to reduce the $CO_2$ emission amount on the well-to-wheel basis (from an oil field to driving a tire. hereinafter also referred to as WtW).

For example, when the battery 18 is charged with the electric power generated in a thermal power plant, the $CO_2$ emission amount on the WtW basis is relatively high. On the other hand, when the battery 18 is charged with the electric power generated by using renewable energy such as solar power generation or wind power generation, the $CO_2$ emission amount on the WtW basis is relatively low. For example, in a region where all the electric power is generated by the renewable energy, the $CO_2$ emission amount on the WtW basis when the vehicle 10 travels with the electric motor 17 can be zero. The lower the ratio of the electric power generated by the renewable energy, the higher the $CO_2$ emission amount on the WtW basis. Therefore, in the future, as the ratio of the amount of electric power generated by the renewable energy increases, the $CO_2$ emission amount on the WtW basis when the vehicle travels with the electric motor 17 decreases. As described above, the $CO_2$ emission amount on the WtW basis may change depending on the region where the vehicle 10 travels or time when the vehicle 10 travels.

Therefore, in the server 30, the $CO_2$ emission amount on the WtW basis when each vehicle 10 travels on each route is calculated, and the combination of the route and the vehicle 10 in which the $CO_2$ emission amount on the WtW basis is the lowest is extracted. Since the $CO_2$ emission amount on the WtW basis when the vehicle travels in each travel mode correlates with the energy consumed by the vehicle 10, the $CO_2$ emission amount is calculated based on this energy. The energy consumed by the vehicle 10 can be calculated in the same manner as in the first embodiment. Further, the $CO_2$ emission amount on the WtW basis with respect to the consumption energy when the vehicle travels with each drive source is stored in the auxiliary storage unit 33.

Figures 11, 12:
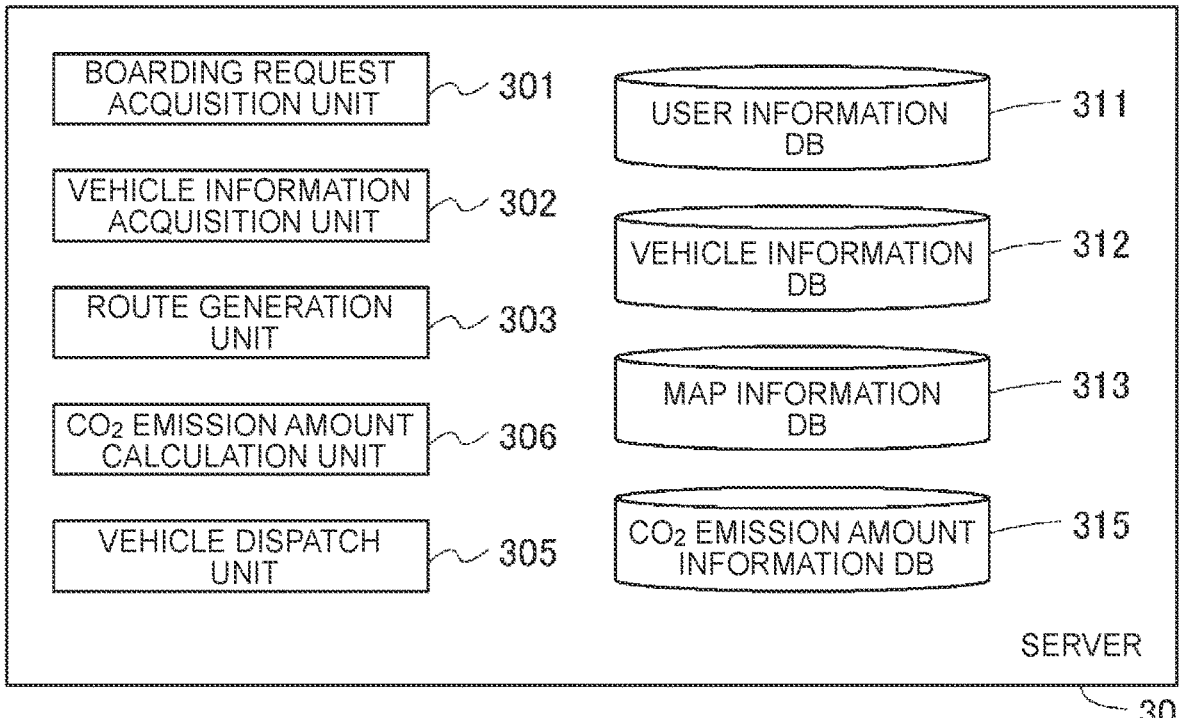
FIG. 11 is a diagram showing an example of a functional configuration of a server.
FIG. 12 is a diagram showing an example of a table configuration of information on carbon dioxide ($CO_2$) emission amount stored in a $CO_2$ emission amount information DB.

Next, the function of the server 30 according to the second embodiment will be described. FIG. 11 is a diagram showing an example of a functional configuration of the server 30. The server 30 includes the boarding request acquisition unit 301, the vehicle information acquisition unit 302, the route generation unit 303, a $CO_2$ emission amount calculation unit 306, the vehicle dispatch unit 305, the user information DB 311, the vehicle information DB 312, the map information DB 313, and a $CO_2$ emission amount information DB 315. Since the functional components other than the $CO_2$ emission amount calculation unit 306 and the $CO_2$ emission amount information DB 315 are the same as those in the first embodiment, the description thereof will be omitted. In the second embodiment, the $CO_2$ emission amount calculation unit 306 and the $CO_2$ emission amount information DB 315 will be mainly described.

The processor 31 of the server 30 executes the process of the $CO_2$ emission amount calculation unit 306 using a computer program stored in the main storage unit 32. Further, the $CO_2$ emission amount information DB 315 is constructed in such a manner that a program of a database management system (DBMS) executed by the processor 31 manages data stored in the auxiliary storage unit 33. The $CO_2$ emission amount information DB 315 is, for example, a relational database.

FIG. 12 is a diagram showing an example of a table configuration of information on the $CO_2$ emission amount stored in the $CO_2$ emission amount information DB 315. The $CO_2$ emission amount information DB 315 according to the second embodiment is a database used by the $CO_2$ emission amount calculation unit 306 when calculating the $CO_2$ emission amount on the WtW basis. The table of the $CO_2$ emission amount information includes fields for the region, the $CO_2$ emission amount during fuel consumption, and the $CO_2$ emission amount during electric power consumption.

Since the region field is the same as that in FIG. 7, the description thereof will be omitted. In the field of $CO_2$ emission amount during fuel consumption, information on the $CO_2$ emission amount when the fuel of the internal combustion engine 19 is consumed is input. In the field of $CO_2$ emission amount during fuel consumption, for example, information on the $CO_2$ emission amount (g/kg) when 1 kg of the fuel is consumed is input. In the field of $CO_2$ emission amount during electric power consumption, information on the $CO_2$ emission amount corresponding to the electric energy for charging the battery 18 is input. In the field of $CO_2$ emission amount during electric power consumption, for example, information on the $CO_2$ emission amount (g/J) per 1 J of the electric energy when the battery 18 is charged with a commercial power source is input. The $CO_2$ emission amount calculation unit 306 acquires the information on the $CO_2$ emission amount during electric power consumption and the information on the $CO_2$ emission amount during fuel consumption at predetermined time intervals from, for example, a Web server that manages these kinds of information, and stores these kinds of information in the $CO_2$ emission amount information DB 315.

The $CO_2$ emission amount calculation unit 306 acquires the region where the vehicle 10 is located based on the position information received from the vehicle 10. Then, the information on the $CO_2$ emission amount at the time of fuel consumption and the information on the $CO_2$ emission amount at the time of electric power consumption, which correspond to the region, are acquired from the $CO_2$ emission amount information DB315.

Further, the $CO_2$ emission amount calculation unit 306 extracts the combination of the route and the vehicle 10 in which the $CO_2$ emission amount is the lowest as a whole of the system 1, based on the $CO_2$ emission amount during fuel consumption and the $CO_2$ emission amount during electric power consumption. In the same manner as in the first embodiment, the $CO_2$ emission amount calculation unit 306 calculates the consumption energy of each vehicle 10 when traveling on each route, and calculates the $CO_2$ emission amount based on the consumption energy. For each of the PHEV 10B and the HEV 10C, for example, the $CO_2$ emission amount may be calculated assuming that the internal combustion engine utilization ratio in FIG. 4 is a predetermined value.

For example, the $CO_2$ emission amount (g) when the vehicle travels with the electric motor 17 can be calculated by multiplying the consumption energy (J) by the $CO_2$ emission amount during electric power consumption (g/J). Further, for example, the $CO_2$ emission amount (g) when the vehicle travels with the internal combustion engine 19 can be calculated by multiplying the value obtained by dividing the consumption energy (J) by the heat generation amount of fuel (J/kg) by the $CO_2$ emission amount during fuel consumption (g/kg).

In the above description, for each of the PHEV 10B and the HEV 10C, the $CO_2$ emission amount is calculated assuming that the internal combustion engine utilization ratio in FIG. 4 is a predetermined value. As another method, the control for switching the drive source may be updated in the PHEV 10B and the HEV 10C such that the $CO_2$ emission amount is further reduced.

For example, the $CO_2$ emission amount when the vehicle travels with the electric motor 17 is compared with the $CO_2$ emission amount when the vehicle travels with the internal combustion engine 19, and the drive source is switched such that the drive source in which the $CO_2$ emission amount is further reduced is prioritized. For example, by changing the speed or the load of the vehicle 10 in which the drive source is switched, the vehicle 10 can be controlled such that the $CO_2$ emission amount is further reduced.

For example, in a region where the $CO_2$ emission amount on the WtW basis when the vehicle travels with the internal combustion engine 19 is relatively low, the $CO_2$ emission amount on the WtW basis as a whole of the system 1 can be reduced by preferentially using the internal combustion engine 19. In this case, for example, an operating region in which the internal combustion engine 19 is selected as the drive source is expanded. That is, the speed or the load of the vehicle 10 in which the drive source is switched from the electric motor 17 to the internal combustion engine 19 is reduced. In this case, for example, when the vehicle dispatch unit 305 generates an operation command, the vehicle dispatch unit 305 may include and generate a command for switching the drive source and transmit the command to the vehicle 10.

On the other hand, in a region where the $CO_2$ emission amount on the WtW basis when the vehicle travels with the electric motor 17 is relatively low, for example, the $CO_2$ emission amount on the WtW basis as a whole of the system 1 can be reduced by preferentially using the electric motor 17. In this case, for example, an operating region in which the electric motor 17 is selected as the drive source is expanded. That is, the speed or the load of the vehicle 10 in which the drive source is switched from the electric motor 17 to the internal combustion engine 19 is increased.

Figure 13:
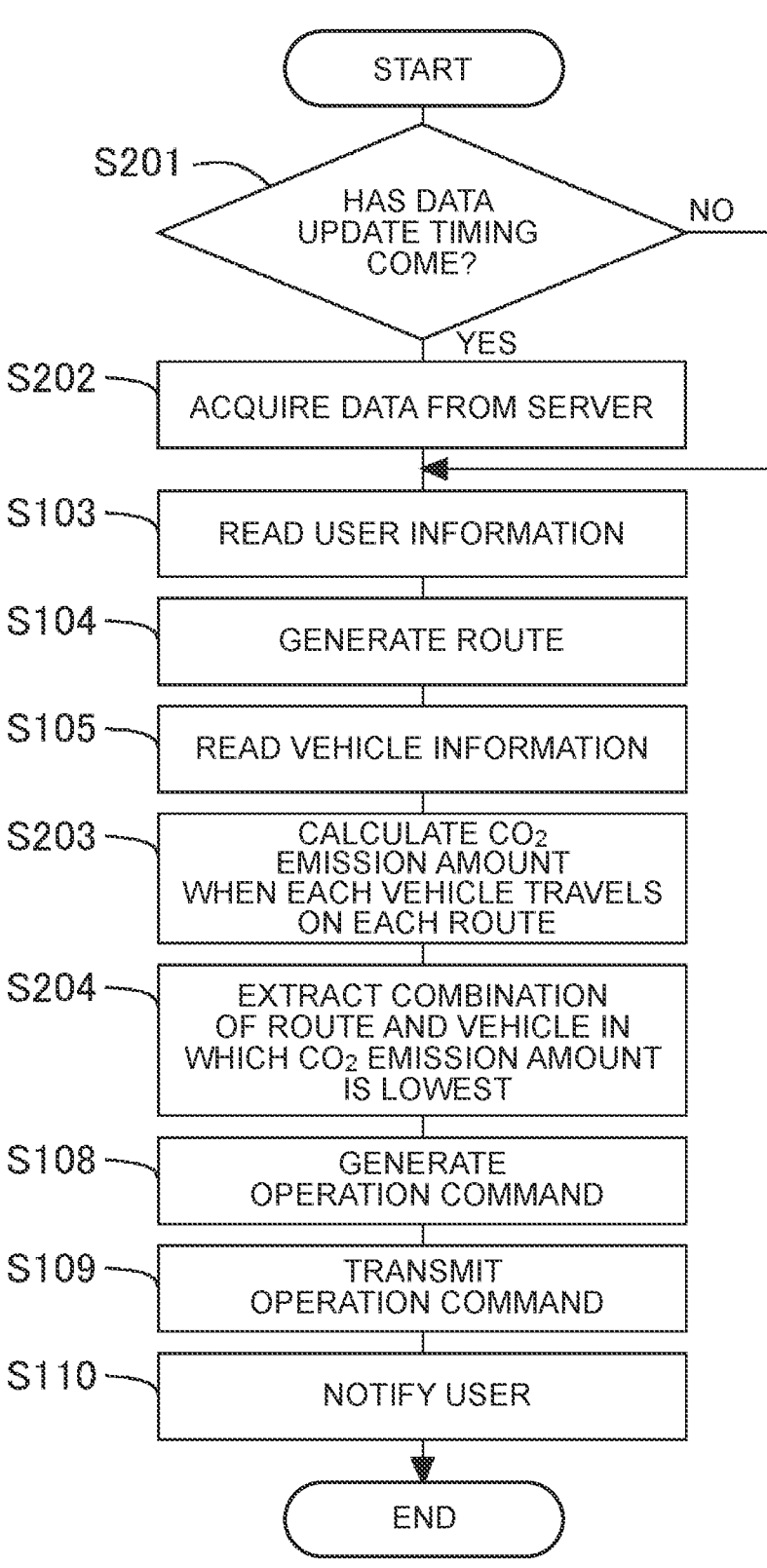
FIG. 13 is a flowchart of a vehicle dispatch process according to a second embodiment.

Next, a vehicle dispatch process in the server 30 will be described. FIG. 13 is a flowchart of the vehicle dispatch process according to the second embodiment. The vehicle dispatch process shown in FIG. 13 is executed at the server 30 at predetermined time intervals. In addition, a description will be given assuming that the boarding request has already been acquired from the user terminal 40. The steps in which the same processes as those in the flow shown in FIG. 10 are executed are designated by the same reference signs, and the description thereof will be omitted.

In step S201, the $CO_2$ emission amount calculation unit 306 determines whether data update timing has come. This data is data for calculating the $CO_2$ emission amount when the vehicle travels with each drive source (the electric motor 17 or the internal combustion engine 19), and is information on the $CO_2$ emission amount stored in the $CO_2$ emission amount information DB 315. This data is updated periodically. When the determination result is Yes in step S201, the process proceeds to step S202, and when the determination result is No, the process proceeds to step S103.

In step S202, the $CO_2$ emission amount calculation unit 306 acquires the data from an external server. The $CO_2$ emission amount calculation unit 306 accesses the external server and acquires the data for calculating the $CO_2$ emission amount when the vehicle travels with each drive source (the electric motor 17 or the internal combustion engine 19). At this time, the $CO_2$ emission amount calculation unit 306 acquires data according to each region. That is, the $CO_2$ emission amount calculation unit 306 acquires information on the $CO_2$ emission amount and stores the information in the $CO_2$ emission amount information DB 315 according to the region where the vehicle 10 is charged or refueled.

Further, in the routine shown in FIG. 13, when the process of step S105 is completed, the process proceeds to step S203. In step S203, the $CO_2$ emission amount calculation unit 306 calculates, for each vehicle 10 on each route, the $CO_2$ emission amount on the WtW basis when each vehicle 10 travels on each route generated in step S104. The $CO_2$ emission amount calculation unit 306 calculates the $CO_2$ emission amount for all combinations of the routes and the vehicles 10.

The $CO_2$ emission amount calculation unit 306 calculates, for example, the $CO_2$ emission amount per unit distance when it is assumed that the vehicle travels on each route with the electric motor 17 by the following formula.

$$CO_2 \text{ emission amount (g)} = \text{consumption energy (J)} \times CO_2 \text{ emission amount during electric power consumption (g/J)}$$

By integrating the $CO_2$ emission amount per unit distance with the distance of the route, it is possible to obtain the $CO_2$ emission amount when the vehicle travels on the route with the electric motor 17.

Further, the $CO_2$ emission amount calculation unit 306 calculates, for example, the $CO_2$ emission amount per unit distance when it is assumed that the vehicle travels on each route with the internal combustion engine 19 by the following formula.

$$CO_2 \text{ emission amount (g)} = \text{consumption energy (J)} \div \text{heat generation amount of fuel (J/kg)} \times CO_2 \text{ emission amount during fuel consumption (g/kg)}$$

By integrating the $CO_2$ emission amount per unit distance with the distance of the route, it is possible to obtain the $CO_2$ emission amount when the vehicle travels on the route with the internal combustion engine 19.

In step S204, the $CO_2$ emission amount calculation unit 306 extracts the combination of the route and the vehicle 10 in which the $CO_2$ emission amount as a whole of the system 1 is the lowest. The $CO_2$ emission amount calculation unit 306 calculates the $CO_2$ emission amount in all cases where each vehicle 10 travels on each route, and extracts the combination in which the $CO_2$ emission amount is the lowest. When the process of step S204 is completed, the process proceeds to step S108.

As described above, according to the second embodiment, the combination of the route and the vehicle 10 in which the $CO_2$ emission amount on the WtW basis as a whole of the system 1 is the lowest is extracted. Therefore, the $CO_2$ emission amount on the WtW basis as a whole of the system 1 can be further reduced. In the second embodiment, the $CO_2$ emission amount has been described as an example, but the embodiment can be similarly applied to emission amount of other substances. Further, in the second embodiment, the $CO_2$ emission amount on the WtW basis is calculated, but the $CO_2$ emission amount may be calculated based on other concepts such as the tank-to-wheel basis as well as the WtW basis.

Third Embodiment

An incentive may be given to a business operator by reducing the $CO_2$ emission amount on the WtW basis. For example, the lower the $CO_2$ emission amount is, the more subsidies the business operator may receive. In such a case, the combination of the route and the vehicle 10 may be extracted such that a value obtained by subtracting the subsidy received by the business operator from the total amount of the fuel fee and the electric energy fee paid by the business operator is the lowest. In this case, in consideration of the fuel fee, the electric energy fee, and the subsidy based on the $CO_2$ emission amount, the total amount of the fees when each vehicle 10 is dispatched to each route is calculated in all cases, and the combination of the vehicle and the route in which the total amount of the fees is the lowest is extracted.

For example, in step S106 of FIG. 10, when the cost calculation unit 304 calculates, for each vehicle 10 on each route, the fee paid by the business operator when each vehicle 10 travels on each route, the $CO_2$ emission amount calculation unit 306 calculates, for each vehicle 10 on each route, the $CO_2$ emission amount when each vehicle 10 travels on each route, as in step S203 of FIG. 13. Then, the incentive received by the business operator is calculated based on the $CO_2$ emission amount of each route. The relationship between the $CO_2$ emission amount and the incentive received by the business operator is obtained from, for example, an external Web server. Then, the cost calculation unit 304 reduces the amount of the incentive obtained from the fee calculated for each vehicle 10 on each route.

As described above, the combination of the route and the vehicle 10 can be extracted such that the fee paid by the business operator is further reduced.

OTHER EMBODIMENTS

The above-described embodiment is merely an example, and the present disclosure may be appropriately modified and implemented without departing from the scope thereof. The processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function. For example, the server 30 may have a part of the functions of the vehicle 10. Further, for example, the vehicle 10 may have a part or all of the functions of the server 30.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc read-only memory (CD-ROM), digital versatile disc (DVD), Blu-ray disc, etc.), a read only memory (ROM), a random access memory (RAM), an erasable programmable read only memory (EPROM), an electrically erasable programmable read only memory (EEPROM), a magnetic card, a flash memory, an optical card, and any type of medium suitable for storing electronic commands.

What is claimed is:

1. An information processing device comprising at least one memory containing program code; and at least one processor configured to operate as instructed by the program code, the program code comprising:

assigning code configured to cause at least one of the at least one processor to assign, to each of multiple routes, any of multiple vehicles that is able to travel with a drive source of at least one of an electric motor and an internal combustion engine, categories of the vehicles being different from each other;

calculating code configured to cause at least one of the at least one processor to:

calculate, for each of the multiple routes, a required cost of each of the multiple vehicles and each region of a set of regions through which the route passes;

calculate, for each of the multiple routes, a $CO_2$ emission amount when each of the multiple vehicles travels a corresponding route of the multiple routes, wherein based on a vehicle, of the multiple vehicles, having both an electric motor and an internal combustion engine, the vehicle is configured to select the drive source based on a $CO_2$ emission factor associated with a power source from which a battery of the vehicle is charged, or with a fuel consumed by the internal combustion engine;

obtain a relationship between a $CO_2$ emission amount and an incentive given to a business operator; and calculate a subsidy received as an incentive based on the $CO_2$ emission amount;

determining code configured to cause at least one of the at least one processor to determine combinations of the vehicles and the routes and identify a combination having a minimum value, from among a plurality of values corresponding to the combinations of the vehicles and the routes, wherein one of the plurality of values is calculated by subtracting an amount of a subsidy associated with a corresponding combination from a total amount of a required cost associated with the corresponding combination; and command code configured to cause at least one of the at least one processor to:

generate at least one travel command based on the determined combinations; and command at least a motor of at least one of the vehicles to travel according to the at least one travel command.

2. The information processing device according to claim 1, wherein the determining code is further configured to cause at least one of the at least one processor to determine the drive source of each of the vehicles such that a sum of the required cost or the $CO_2$ emission amount is the lowest.

3. The information processing device according to claim 1, wherein the at least one memory stores information on a cost corresponding to fuel amount for the internal combustion engine and information on a cost corresponding to electric energy when a battery that supplies electric power to the electric motor is charged.

4. The information processing device according to claim 3, further comprising receiving code configured to cause at least one of the at least one processor to receive, from a server that provides the information on the cost corresponding to the fuel amount for the internal combustion engine or the information on the cost corresponding to the electric energy when the battery that supplies the electric power to the electric motor is charged, the information on the cost corresponding to the fuel amount for the internal combustion engine or the information on the cost corresponding to the electric energy when the battery that supplies the electric power to the electric motor is charged.

5. The information processing device according to claim 1, wherein the calculating code is further configured to cause at least one of the at least one processor to calculate the $CO_2$ emission amount on a well-to-wheel basis.

6. The information processing device according to claim 1, wherein the at least one memory stores information on a $CO_2$ emission amount when the drive source is the internal combustion engine and information on a $CO_2$ emission amount when the drive source is the electric motor.

7. The information processing device according to claim 1, wherein the at least one memory stores information on the drive source for each of the vehicles.

8. An information processing method that executes operations comprising:

when a computer assigns, to each of multiple routes, any of multiple vehicles that is able to travel with a drive source of at least one of an electric motor and an internal combustion engine, categories of the vehicles being different from each other, calculating, for each of the multiple routes, a required cost of each of the multiple vehicles and each region of a set of regions through which the route passes;

calculating, for each of the multiple routes, a $CO_2$ emission amount when each of the multiple vehicles travels a corresponding route of the multiple routes, wherein based on a vehicle, of the multiple vehicles, having both an electric motor and an internal combustion engine, the vehicle is configured to select the drive source based on a $CO_2$ emission factor associated with a power source from which a battery of the vehicle is charged, or with a fuel consumed by the internal combustion engine;

obtaining a relationship between a $CO_2$ emission amount and an incentive given to a business operator; and calculating a subsidy received as an incentive based on the $CO_2$ emission amount;

determining combinations of the vehicles and the routes and identifying a combination having a minimum value, from among a plurality of values corresponding to the combinations of the vehicles and the routes, wherein one of the plurality of values is calculated by subtracting an amount of a subsidy associated with a corresponding combination from a total amount of a required cost associated with the corresponding combination;

generating at least one travel command based on the determined combinations; and commanding at least a motor of at least one of the vehicles to travel according to the at least one travel command.

9. The information processing method according to claim 8, wherein the computer determines the drive source of each of the vehicles such that the sum of the required cost or the $CO_2$ emission amount is the lowest.

10. The information processing method according to claim 8, wherein the computer causes at least one memory to store information on a cost corresponding to fuel amount for the internal combustion engine and information on a cost corresponding to electric energy when a battery that supplies electric power to the electric motor is charged.

11. The information processing method according to claim 10, wherein the computer receives, from a server that provides the information on the cost corresponding to the fuel amount for the internal combustion engine or the information on the cost corresponding to the electric energy when the battery that supplies the electric power to the electric motor is charged, the information on the cost corresponding to the fuel amount for the internal combustion engine or the information on the cost corresponding to the electric energy when the battery that supplies the electric power to the electric motor is charged.

12. The information processing method according to claim 8, wherein the computer calculates the $CO_2$ emission amount on a well-to-wheel basis.

13. The information processing method according to claim 8, wherein the computer causes at least one memory that stores information on $CO_2$ emission amount when the drive source is the internal combustion engine and information on $CO_2$ emission amount when the drive source is the electric motor.

14. The information processing device according to claim 1, wherein the relationship between a $CO_2$ emission amount and the incentive is obtained from an external server.

15. The information processing method according to claim 8, wherein the relationship between a $CO_2$ emission amount and the incentive is obtained from an external server.

16. The information processing device according to claim 1, wherein the calculating code is further configured to:
  calculate an amount obtained by subtracting the subsidy from the total cost required for all combinations in which each of the multiple vehicles travels each of the multiple routes.

17. The information processing method according to claim 8, further comprising:
  calculating an amount obtained by subtracting the subsidy from the total cost required for all combinations in which each of the multiple vehicles travels each of the multiple routes.

18. The information processing device according to claim 1, wherein the $CO_2$ emission factor is calculated using a $CO_2$ emission amount information database mapping regions with corresponding $CO_2$ emission amounts during fuel consumption and $CO_2$ emission amounts during electric power consumption.

19. The information processing device according to claim 1, wherein the subsidy received as an incentive is based on a $CO_2$ emission amount that varies by each region and a time of travel of one of the multiple vehicles.

* * * * *